United States Patent Office 3,170,264
Patented Feb. 23, 1965

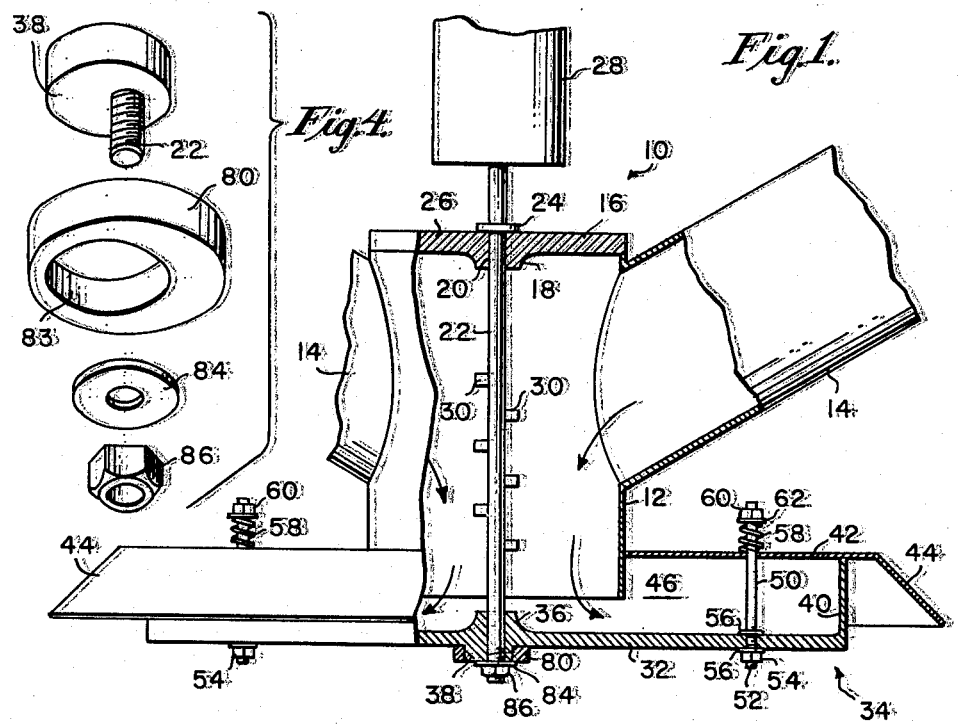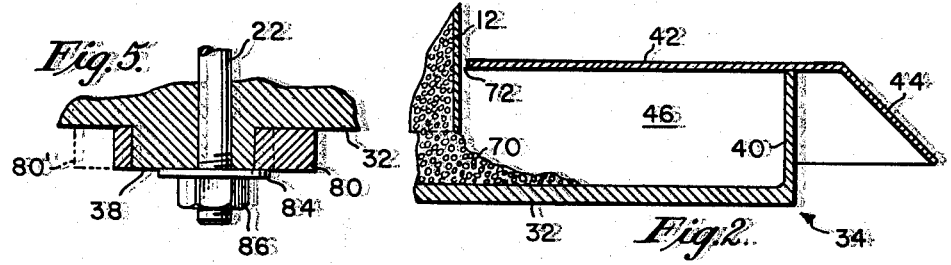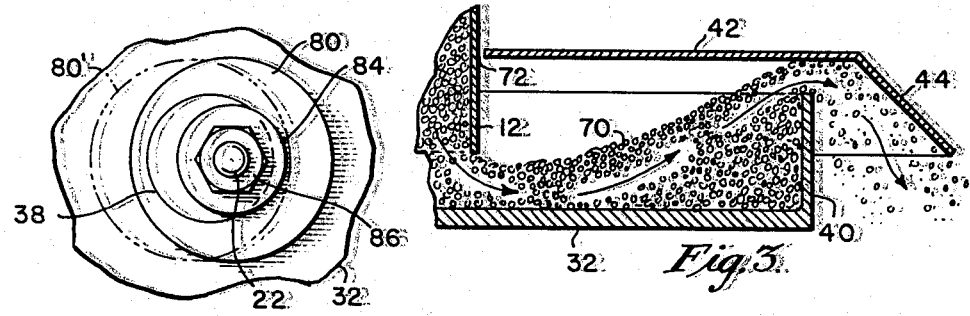

3,170,264
CENTRIFUGAL SPRAY DEVICE
John E. Waldrum, Ambler, Pa., assignor to Amchem Products, Inc., Ambler, Pa., a corporation of Delaware
Filed Aug. 11, 1961, Ser. No. 130,994
1 Claim. (Cl. 43—145)

This invention relates to a dispensing device for distributing particulate solid material, and is especially adapted for use on either rotary or fixed wing aircraft as an aerial applicator of plant growth regulants, herbicides, insecticides, and other agricultural preparations.

An important object of the invention is to provide a dispensing device of the character described which employs a disc assembly for receiving and then discharging particles, said assembly including a yieldable means whereby said assembly remains closed when it is at rest, and opens to discharge the particles in response to a centrifugal force developed in the assembly when it rotates.

The instant distributing device differs from that disclosed and claimed in my prior Patent No. 2,917,241 in a number of respects. The prior device has for its purpose the distribution of liquids, whereas the instant device distributes particulate solids.

The instant device differs structurally in several particulars including providing agitating or vibrating means to prevent agglomeration of any sticky materials that might be used. Another distinction is that in my prior device the disc assembly is rotated with the feed tube, while in the instant device, the feed tube remains stationary, as a bottom plate rotates in a fixed horizontal plane whereas the top plate is movable vertically relative to the bottom plate, thereby presenting important advantages.

It is therefore an object of this invention to provide a novel particulate material distributor.

It is another object of this invention to provide a particulate material distributor which sprays in such a manner that material departs from the sprayer at the lowest point of the structure, whereby the sprayer does not interfere with the pattern of the spray particles.

It is a further object of this invention to provide a particulate material distributor that includes agitating means to prevent agglomeration of any sticky materials.

It is yet a further object of this invention to provide a particulate material distributor wherein the feed tube remains stationary while the distributing head is rotated.

This and other objects are obtained by providing a spray device comprising a distributing chamber, a feed tube associated with said chamber, a shaft for rotating said distributing chamber, and agitating means associated with said shaft.

Other objects and many of the attendant advantages of this invention will be readily appreciated as the same becomes better understood by reference to the following detailed description when considered in connection with the accompanying drawings wherein:

FIG. 1 is a front elevational view of an embodiment of the present invention with parts being broken away to show certain internal construction in section;

FIG. 2 is a fragmentary enlarged vertical sectional view through an outer portion of the disc assembly containing particulate material being shown in a closed position;

FIG. 3 is a view similar to FIG. 2 showing the disc assembly in an open or spraying position;

FIG. 4 is an exploded view of the elements constituting the vibratory assembly for the disc assembly;

FIG. 5 is a sectional view of the elements of FIG. 4 in assembled form showing another position of the counterweight in phantom; and FIG. 6 is a plan view of the assembly of FIG. 5, taken from the bottom thereof, and showing another position of the counterweight in phantom.

Referring now in greater detail to the various figures of the drawings wherein similar reference characters refer to similar parts, a dry feeder spray device embodying the present invention is generally shown at 10 in FIG. 1. Device 10 basically comprises a central feed tube 12 having feed channels 14 which are downwardly inclined and which enter feed tube 12 at the sides thereof. Although two feed channels 14 are shown, any desired number of channels including one channel may be employed. Two channels can be used when large amounts of solids are to be supplied or when two different particulate compositions are to be supplied and ultimately mixed in feed tube 12.

The top of feed tube 12 is sealed by plate 16 having inwardly projecting hub 18. Hub 18 has a bore which constitutes an internal bearing surface 20, in which shaft 22 is journalled. A collar 24 of resistant material, having a bearing surface abutting the top surface 26 of plate 16, is secured to shaft 22 to limit downward movement thereof. A suitable drive means, such as motor 28, is provided to rotate shaft 22. A plurality of radially extending, spaced agitator blades or paddles 30 project from shaft 22. These paddles can be used to break down any agglomerates which may form when sticky materials are being used. Otherwise, these agglomerates might form a barrier to the free flow of the material to the disc assembly. Paddles 30 can also serve the function of mixing or forming a homogenous mixture when two different compositions are fed through feed channels 14.

A lower plate 32 of disc assembly 34 is keyed, or otherwise secured, to shaft 22 for rotation therewith.

Plate 32 includes a centrally located, inwardy projecting hub 36 and a downwardly extending, eccentrically located boss 38 through which shaft 22 projects. The purpose of the eccentricity will be described in more detail hereafter. An upstanding peripheral flange or wall 40 extends perpendicularly from and is integral with lower plate 32.

Disc assembly 34 further includes an upper plate 42, which rests on the top of peripheral flange 40. As seen in FIG. 1, top plate 42 is of a slightly larger diameter than bottom plate 32, so as to completely cover peripheral flange 40 thereof. Top plate 42 includes an integral, depending inclined peripheral flange 44, although flange 44 may be adjustable or positioned otherwise, such as perpendicular, or eliminated if so desired.

A yieldable means is provided for keeping the plates assembled together and for allowing upper plate 42 to move relative to lower plate 32. Thus, the plates open for the discharge of particles in response to the centrifugal pressure built up in chamber 46, formed between upper plate 42 and lower plate 32, as the disc assembly is rotated and particles are delivered to the chamber. A preferred yieldable means comprises at least one shank 50, having a threaded end 52 secured through an appropriate opening in lower plate 32 by nut 54 and associated spacer washers 56. The opposite end of shank 50 is threaded and passes through an appropriate opening in upper plate 42. A coiled compression spring 58 is placed over the upper end of shank 50 and is secured against the top of plate 42 by nut 60, with associated washer 62, threaded on the upper end of shank 50. The spring is so tensioned by adjustment of nut 60 as to keep the upper and lower plates normally in the closed position when the disc assembly is at rest. Thus, the upper plate 42 rests upon the upper edge of peripheral flange 40 of lower plate 32. This condition is shown in FIGS. 1 and 2. It should also be noted that FIG. 2 depicts the disc assembly prior to rotation, with particulate solid material 70 lying primarily in the area immediately under feed tube 12.

When motor 28 is energized and the disc assembly 34 is rotated via shaft 22, the particulate material entering chamber 46 through feed tube 12 is caused to swirl around by the centrifugal force of rotation thereby creating a sufficient centrifugal force or momentum in the particulate material to exert an upward force against the lower surface of upper plate 42. This causes upper plate 42 to move upwardly relative to lower plate 32 thereby compressing spring 58.

Upper plate 42 rises relative to lower plate 32 to the point where the peripheral flange 40 becomes spaced from the upper plate 42 as shown in FIG. 3. In this position the particles are centrifugally forced outwardly over the flange 40 as shown by the arrows in FIG. 3, and emerge as a spray depending from and at the angle of flange 44.

It should be noted that in the embodiment illustrated, flange 44 depends at an angle of approximately 45 degrees to the horizontal plate 42. This angle tends to deflect the material being sprayed downward, thus partially eliminating the undesirable side drift of the material being sprayed. If side drift of the material being sprayed is not a factor, obviously the overlapping flange can project outwardly. Likewise, in other cases, the angle of the flange can be increased up to a maximum of about 90 degrees.

It should also be noted that upper plate 42 has a centrally located, circular hole 72 through which feed tube 12 projects.

Thus when disc assembly 34 is rotated, feed tube 12 remains stationary. Feed tube 12 protrudes into chamber 46 at a sufficient depth to prevent any loss of material through hole 72. As is apparent, the diameter of hole 72 is slightly larger than the outer diameter of feed tube 12.

As previously pointed out, lower plate 32 has an integral dependent eccentrically located boss 38, through which shaft 22 is passed (FIG. 4). Surrounding boss 38 is a counterbalancing disc 80, having an eccentrically located hole 83 equal in diameter to the outer diameter of boss 38. The thickness of the disc 80 is equal to that of the boss 38 as indicated in FIG. 5. The disc is secured in place by washer 84 and nut 86 threaded on the bottom of shaft 22. The nut and washer serve the additional function of supporting lower plate 32.

The function of the eccentric boss 38 and counterbalancing disc 80 will now be explained. As previously pointed out, when sticky materials are used, agglomerates tend to form. These agglomerates are broken up in the feed tube by agitating paddles 30. In order to keep the sticky materials in particulate form when in chamber 46, it is necessary to vibrate disc assembly 34. This is accomplished by merely adjusting counterweight 80 to a set eccentric as shown in phantom at 80' in FIGS. 5 and 6. This eccentricity will cause an imbalance in lower plate 32, which will in turn cause disc assembly 34 to vibrate when rotated. When non-agglomerating materials are used, the imbalance can be eliminated by shifting the counterweight 80 to the position shown in FIGS. 1, 5 and 6. This results in having shaft 22 eccentrically located with respect to lower plate 32. Thus, any eccentricity placed on the left of shaft 22 by boss 38 is counterbalanced by the eccentricity caused by disc 80 on the right of shaft 22.

Obviously many modifications and variations of the present invention are possible in the light of the above teachings. For instance, boss 38 need not be integral with plate 32, but can be an abutting disc with an eccentric hole therein. It is, therefore, to be understood that within the scope of the appended claim, the invention may be practiced otherwise than as specifically described.

What is claimed as the invention is:

A centrifugal spray device comprising a disc assembly including a pair of generally flat plates resiliently connected to each other in spaced face-to-face relationship to form a chamber therebetween, one of said plates being positioned above the other, the lower of said plates having an upwardly extending peripheral wall with an upper edge thereof abutting the under surface of the upper plate, said upper plate extending peripherally beyond the wall, conduit means opening into said chamber, a shaft secured to said lower plate for rotating said plate, agitating and vibrating means associated with said shaft and including a boss associated with said lower plate, said boss being eccentrically located with respect to said shaft, and a disc counterbalancing said boss, said disc having an eccentric hole therein, said disc telescopingly engaging said boss through said hole whereby said disc and said boss are positioned in counterbalancing relationship with respect to each other.

References Cited in the file of this patent
UNITED STATES PATENTS

| | | |
|---|---|---|
| 1,392,345 | Lowe | Oct. 4, 1921 |
| 1,674,391 | Dunnagan | June 19, 1928 |
| 2,917,241 | Waldrum | Dec. 15, 1959 |
| 2,990,011 | Stratford | June 27, 1961 |
| 3,079,050 | Wahl | Feb. 26, 1963 |